(12) United States Patent
Watanabe

(10) Patent No.: US 7,367,234 B2
(45) Date of Patent: May 6, 2008

(54) PRESSURE SENSOR

(75) Inventor: Jun Watanabe, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 11/466,616

(22) Filed: Aug. 23, 2006

(65) Prior Publication Data

US 2007/0068265 A1 Mar. 29, 2007

(30) Foreign Application Priority Data

Aug. 24, 2005 (JP) ............... 2005-242246

(51) Int. Cl.
*G01L 9/12* (2006.01)
(52) U.S. Cl. .......................... 73/718; 73/724
(58) Field of Classification Search .......... 73/718, 73/724

See application file for complete search history.

(56) References Cited

U.S. PATENT DOCUMENTS 6,598,483 B2 * 7/2003 Miyashita et al. ............ 73/718

2002/0011114 A1 * 1/2002 Miyashita et al. ............ 73/718

FOREIGN PATENT DOCUMENTS

| JP | 06-132544 | 5/1994 |
|---|---|---|
| JP | 09-015257 | 1/1997 |
| JP | 10-308519 | 11/1998 |
| JP | 2000-088686 | 3/2000 |
| JP | 2000-187040 | 7/2000 |
| JP | 2004-214058 | 7/2004 |
| WO | WO 2005-003711 | 1/2005 |

* cited by examiner

*Primary Examiner*—Andre J. Allen
(74) *Attorney, Agent, or Firm*—Harness, Dickey & Pierce, P.L.C.

(57) ABSTRACT

To accurately set a detection axis of a sensor even when the sensor is attached to an inclined surface, provided is: a sensor responsive to an operation to a predetermined detection axis. A sensor device accommodates this sensor 1 and is a lead provided for conduction between a terminal of this sensor device and a mounting board. A mold for fixing the sensor device to set the detection axis of the sensor and a bottom surface of the mold with a desired angle is also provided.

8 Claims, 5 Drawing Sheets

PRESSURE SENSOR

FIELD

The present invention relates to a pressure sensor.

BACKGROUND

Patent Document 1 discloses a pressure sensor of related art that detects a pressure based on a deformation amount of a diaphragm. The pressure sensor according to Patent Document 1 is structured so that a silicon substrate having a diaphragm functioning as a movable electrode is joined with a glass substrate so that one surface of the diaphragm is sealed to provide a pressure reference room.

The diaphragm deflects in accordance with a difference between, under a usage environment, an external pressure and a reference pressure in the pressure reference room to have a contact with a dielectric material layer on a glass substrate. Under the dielectric material layer of the glass substrate, opposed electrodes are formed. In this manner, a change of the contact area depending on an external pressure is detected as a change in the interelectrode capacity, thereby providing a function of a pressure sensor. The pressure sensor having the structure as described above is called as a touch mode capacitive pressure sensor and has a high detection sensitivity and a high pressure resistance.

Patent Document 1 JP-A-2002-214058

In the above-described pressure sensor, a silicon substrate can be joined with a glass substrate by an anodic bonding. This anodic bonding does not involve gas generation in contrast with a junction using jointing material (e.g., brazing material) and thus is suitable for accurately setting a reference pressure in the pressure reference room. This anodic bonding is also a method that is suitable for accurately specifying a gap between a movable electrode and opposed electrodes (dielectric material layer).

However, this anodic bonding requires the substrates to be heated. This causes, when to-be-joined substrates have different thermal expansion coefficients, a problem of an in-plane distortion in the substrates. The diaphragm in particular tends to deform and thus is easily influenced by such a distortion, which may cause fluctuation in the characteristics.

SUMMARY

The invention has been made in order to solve the above problem and has an objective of providing a pressure sensor in which an in-plane distortion due to junction is reduced.

An advantage of the invention is to provide a pressure sensor that can reduce the in-plane distortion due to the junction.

According to one aspect of the invention, a pressure sensor is provided by joining, at opposing faces, a substrate having a movable electrode formed at a diaphragm with a substrate having an opposed electrodes opposed to the movable electrode, wherein: a slit is formed on at least one of the two substrates.

According to the pressure sensor of this invention, the periphery section of the slit functions as an easy deformation section that easily deforms. Thus, the deformation of this easy deformation section absorbs the in-plane distortion of a substrate having the slit.

In the pressure sensor, the slit is preferably provided at the opposing face.

According to the pressure sensor of this invention, the following capability of a joint surface to an opposed substrate is improved. Thus, the in-plane distortion of the opposed substrate is preferably reduced.

In the pressure sensor, the slit is preferably formed in a region adjacent to the junction section.

According to the pressure sensor of this invention, an in-plane distortion is reduced preferably.

In the pressure sensor, the two substrates are preferably joined to seal a predetermined region at the opposing face of the diaphragm to provide a pressure reference room.

According to the pressure sensor of this invention, substrates are joined and the pressure reference room is sealed by a common means. Thus, the pressure sensor of this invention is easily manufactured with a compact size.

In the pressure sensor having the sealed pressure reference room, the slit is preferably provided in the pressure reference room.

According to the pressure sensor of this invention, the distortion in the diaphragm region is preferably reduced and the pressure reference room has a substantially-increased volume. Thus, the reference pressure is more stabilized.

In the pressure sensor, the substrate having the diaphragm preferably uses a crystal plate.

More preferably, the substrate having the diaphragm uses a crystal plate cut by an AT cutting.

According to the pressure sensor of this invention, the diaphragm is formed by quartz having a small hysteresis in the mechanical deformation. Thus, the detection characteristic is more stabilized. Furthermore, the piezoelectric resonance characteristic can be monitored when the diaphragm is formed. Thus, a machining accuracy of a shape and a size related to the deformation characteristic can be enhanced. Preferably, the use of the crystal plate cut by an AT cutting can enhance the machining accuracy of the thickness of the diaphragm that sharply influences the deformation characteristic.

According to another aspect of the invention, a pressure sensor is provided by joining, at opposing faces, a pressure-receiving substrate having a diaphragm and composed of a crystal plate with an opposing substrate opposed to the pressure-receiving substrate, wherein: at least one of the two substrates includes a slit.

In the pressure sensor, the pressure-receiving substrate having the diaphragm uses a crystal plate cut by an AT cutting.

DETAILED DESCRIPTION

Figure 1:
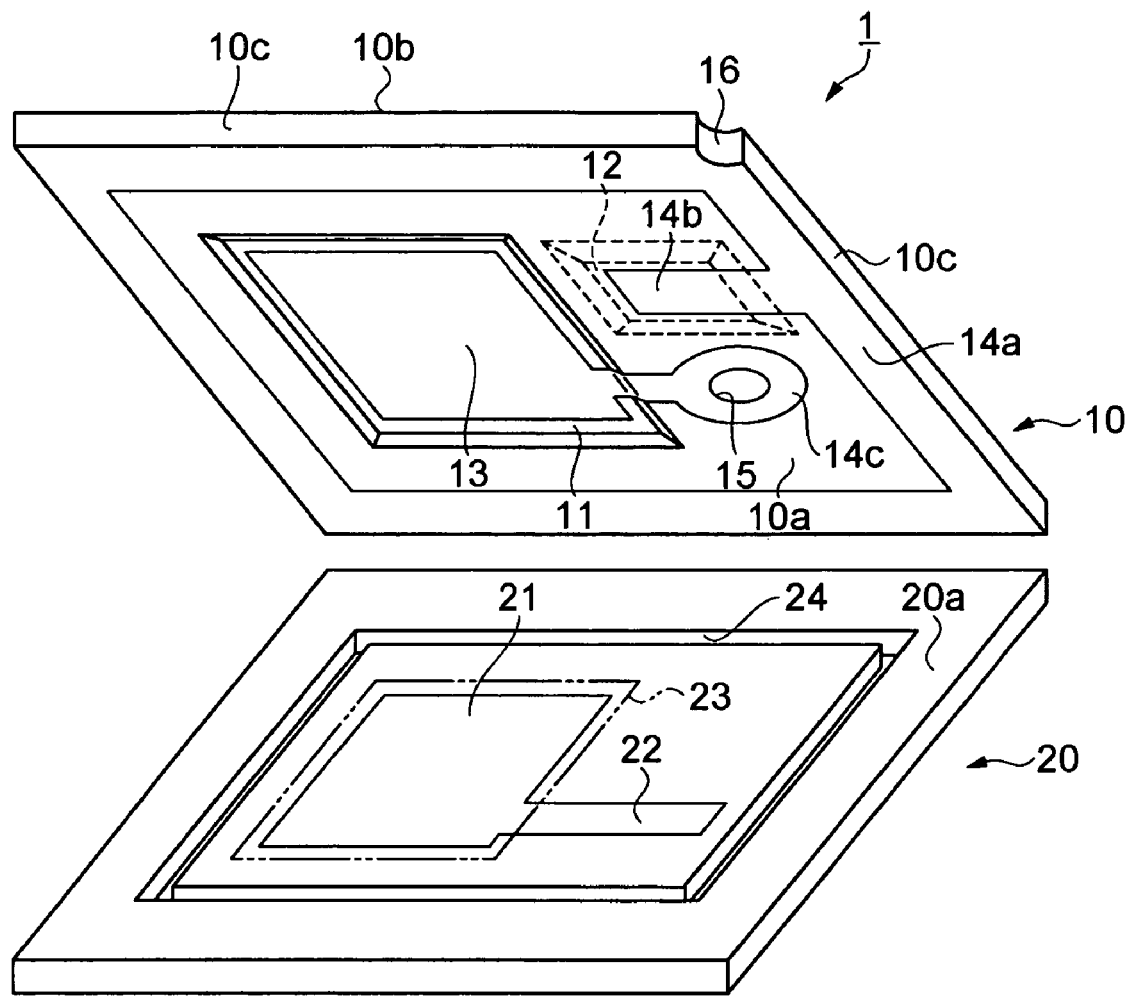
FIG. 1 is an exploded perspective view showing an internal structure of a pressure sensor.

Hereinafter, preferable embodiments of the invention will be described in detail with reference to the attached drawings.

Embodiments described below are preferable and specific examples of the invention and thus are subjected to various technically preferable limitations. However, the scope of the invention is not limited to these embodiments so long as the invention is not specifically limited by the following description. The drawings referred to in the following description are not drawn to an actual scale in order that the respective layers and the respective members can be recognized in the drawings.

First, the structure of a pressure sensor according to the invention will be described with reference to FIG. 1, FIG. 2, FIG. 3, FIG. 4, and FIG. 5.

Figure 2:
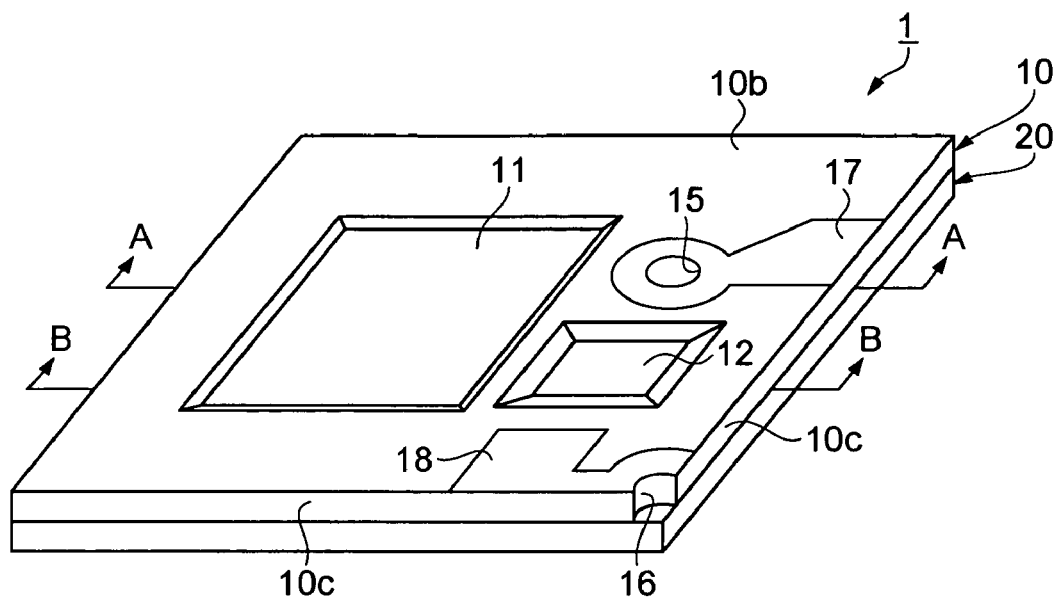
FIG. 2 is a perspective view showing an outer structure of the pressure sensor.
Figure 3:
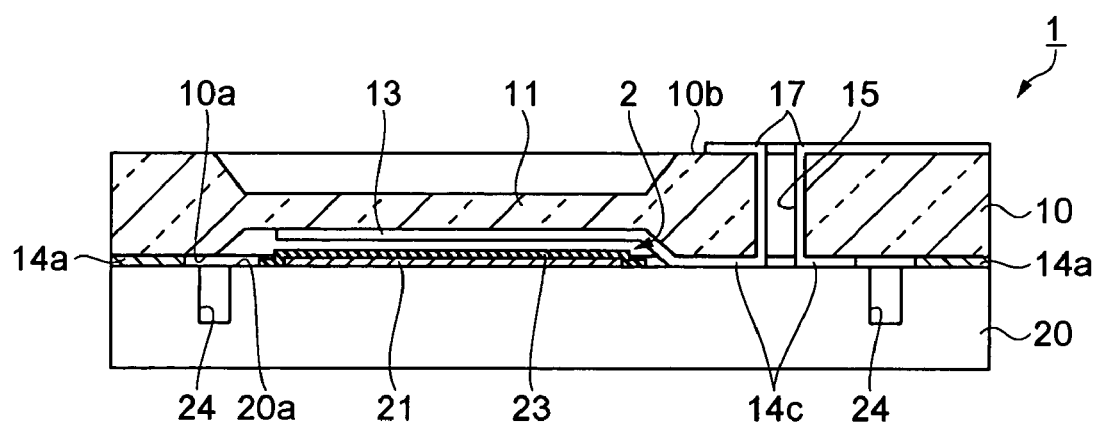
FIG. 3 is a cross-sectional view taken at the line A-A of FIG. 2.
Figure 4:
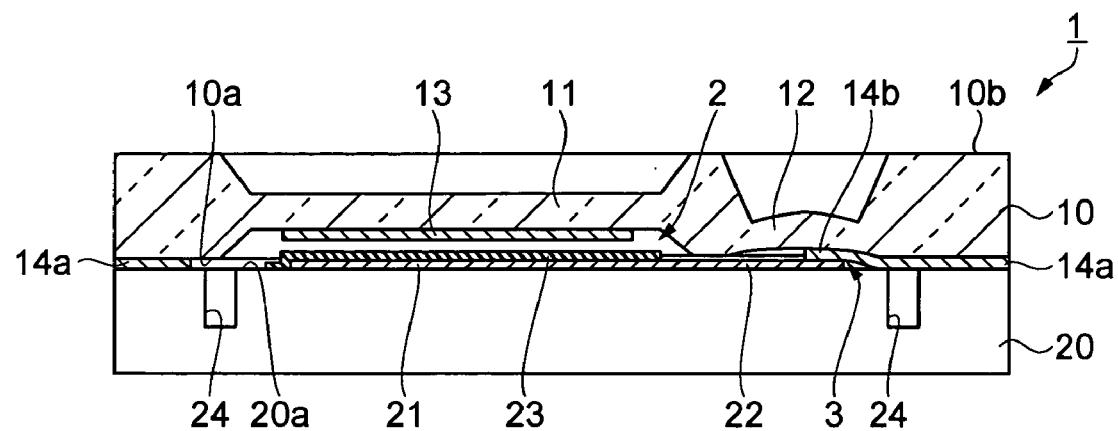
FIG. 4 is a cross-sectional view taken at the line B-B of FIG. 2.
Figure 5:
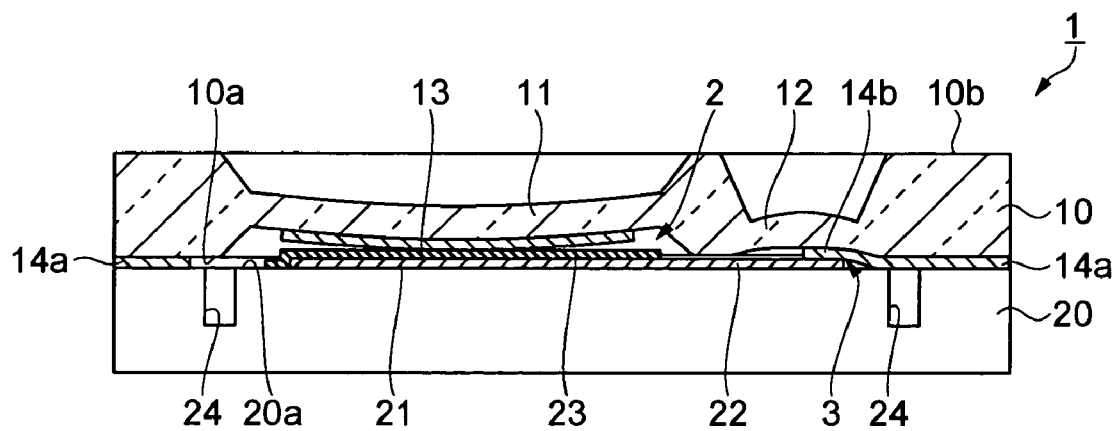
FIG. 5 is a cross-sectional view taken at the line B-B of FIG. 2 under a usage environment.

FIG. 1 is an exploded perspective view showing an internal structure of the pressure sensor. FIG. 2 is a perspective view showing an outer structure of the pressure sensor. FIG. 3 is a cross-sectional view taken at the line A-A of FIG. 2. FIG. 4 is a cross-sectional view taken at the line B-B of FIG. 2. FIG. 5 is a cross-sectional view taken at the line B-B of FIG. 2 under a usage environment.

In FIG. 1 to FIG. 4, a pressure sensor 1 is structured so that a pressure-receiving substrate 10 having a diaphragm 11 is joined with an opposing face 10a and an opposing substrate 20 is joined with an opposing face 20a. In this embodiment, the pressure-receiving substrate 10 includes a crystal plate cut out by an AT cutting. The opposing substrate 20 includes alkali required for the anodic bonding and uses a glass having a similar linear expansion coefficient to that of the pressure-receiving substrate.

In the pressure-receiving substrate 10, the diaphragm 11 has a predetermined region having a thinner thickness and both surfaces thereof are concave from the opposing face 10a and an outer face 10b. The diaphragm 11 has a substantially-square shape. The pressure-receiving substrate 10 also includes a reduced thickness section 12 that is slightly smaller than the diaphragm 11 and that is concave from the opposing face 10b.

The opposing face 10a of the pressure-receiving substrate 10 includes a movable electrode 13 patterned by aluminum or the like and conductive films 14a, 14b, and 14c. The movable electrode 13 is formed on the diaphragm 11. The conductive film 14a is formed along an outer edge section 10c of the pressure-receiving substrate 10. The conductive film 14b is formed on the reduced thickness section 12 so as to extend from the conductive film 14a. The conductive film 14c is formed to extend from the movable electrode 13 and to surround an opening of the through hole 15 formed in the pressure-receiving substrate 10.

An opposing face 20a of the opposing substrate 20 includes an opposed electrodes 21 patterned by aluminum or the like, a lead wiring 22, and a dielectric material film 23 patterned by SiO2 or the like. The opposed electrodes 21 is formed to be opposed to the movable electrode 13 at the pressure-receiving substrate 10 and the dielectric material film 23 is formed so as to cover the opposed electrodes 21. The lead wiring 22 is formed to extend from the opposed electrodes 21 and to be opposed to the conductive film 14b at the pressure-receiving substrate 10.

The conductive films 14a and 14c on the pressure-receiving substrate 10 is subjected to an anodic bonding with the opposing face 20a of the opposing substrate 20, thereby allowing a predetermined region at the opposing face 10a of the diaphragm 11 to be sealed to provide the pressure reference room 2. Here, the pressure reference room 2 is retained to have an inner pressure of a predetermined reference value (generally depressurized status).

The opposing face 20a of the opposing substrate 20 includes a slit 24 along the junction region with the conductive film 14a. This slit 24 is provided for the purpose of mitigating an in-plane distortion that depends on the difference in the thermal expansion coefficient of the substrates 10 and 20 subjected to the anodic bonding. Specifically, a periphery section of the slit 24 in the opposing substrate 20 functions as an easy deformation section that easily deforms so that the deformation of this easy deformation section absorbs the in-plane distortion at the opposing substrate 20. When the opposing face 20a includes the slit 24 as in this embodiment, the slit 24 also provides an improved following capability to the pressure-receiving substrate 10 at the junction face, thus mitigating the in-plane distortion at the pressure-receiving substrate 10.

This embodiment also provides the slit 24 in the pressure reference room 2 to provide a substantial increase of the volume of the pressure reference room 2. Thus, the reference pressure can be stabilized against factors such as leakage.

While the substrates 10 and 20 being joined, the lead wiring 22 and conductive film 14b have a mechanical contact to provide the contact point 3. Then, the spring characteristic of the reduced thickness section 12 formed at the pressure-receiving substrate 10 allows the contact point 3 to show a preferable following capability to the thicknesses of the lead wiring 22 and the conductive film 14b while providing a secure electric connection. In this manner, the joint surface (contact face) between the substrates 10 and 20 can be flattened to provide a strong junction between the substrates and a secure sealing of the pressure reference room 2.

Referring to FIG. 1 to FIG. 4 again, the outer face 10b of the pressure-receiving substrate 10 includes terminal wirings 17 and 18 patterned by aluminum or the like. The terminal wiring 17 is continuously formed to the inner face of the through hole 15 to have a contact with the conductive film 14c. The terminal wiring 18 is continuously formed to a castellation 16 provided at one corner of the pressure-receiving substrate 10 and is continuous with the conductive film 14a. In this manner, the terminal wiring 17 functions as an output terminal of the movable electrode 13 via the conductive film 14c and the terminal wiring 18 functions as an output terminal of the opposed electrodes 21 via the conductive films 14a and 14b, the contact point 3, and the lead wiring 22.

When the reference pressure is balanced with the external pressure, the movable electrode 13 and the dielectric material film 23 are opposed to each other as shown in FIG. 3 and FIG. 4 to have a minute gap therebetween. When the pressure sensor 1 is placed under a usage environment (e.g., atmospheric pressure), the diaphragm 11 is deformed by the deflection as shown in FIG. 5 due to the pressure difference between the reference pressure and the external pressure. In this manner, in accordance with the deformation amount of the diaphragm 11 depending on an external pressure, an area at which the movable electrode 13 has a contact with the dielectric material film 23 is changed. Thus, an external pressure can be detected based on the change of the inter-electrode capacity corresponding to this change of the contact face.

In this embodiment, the pressure-receiving substrate 10 is made of insulating material and the movable electrode 13 is a metal film patterned on the diaphragm 11. Thus, when compared with the pressure sensor as disclosed by JP-A-

2002-214058 in which the entire silicon substrate is made of a conductor to provide a movable electrode, unnecessary shunt capacitance (to an interelectrode capacity) is not caused between conductive wires from both electrodes, providing a superior sensitivity to a relative capacity change. In relation with this, this pressure sensor 1 has a small motional capacitance parasitic between the lead wiring 22 and the conductive film 14*b* at the contact point 3. However, this motional capacitance has much smaller contribution (1% or less) than that by the interelectrode capacity.

In this embodiment, the pressure-receiving substrate 10 including the diaphragm 11 is formed by a crystal plate having a small hysteresis in mechanical deformation. Thus, this pressure sensor 1 provides a stable deformation characteristic of the diaphragm 11 and thus a stable detection characteristic.

Next, a method for manufacturing a pressure sensor will be described with reference to FIG. 1 to FIG. 4 and FIG. 6.

Figure 6:
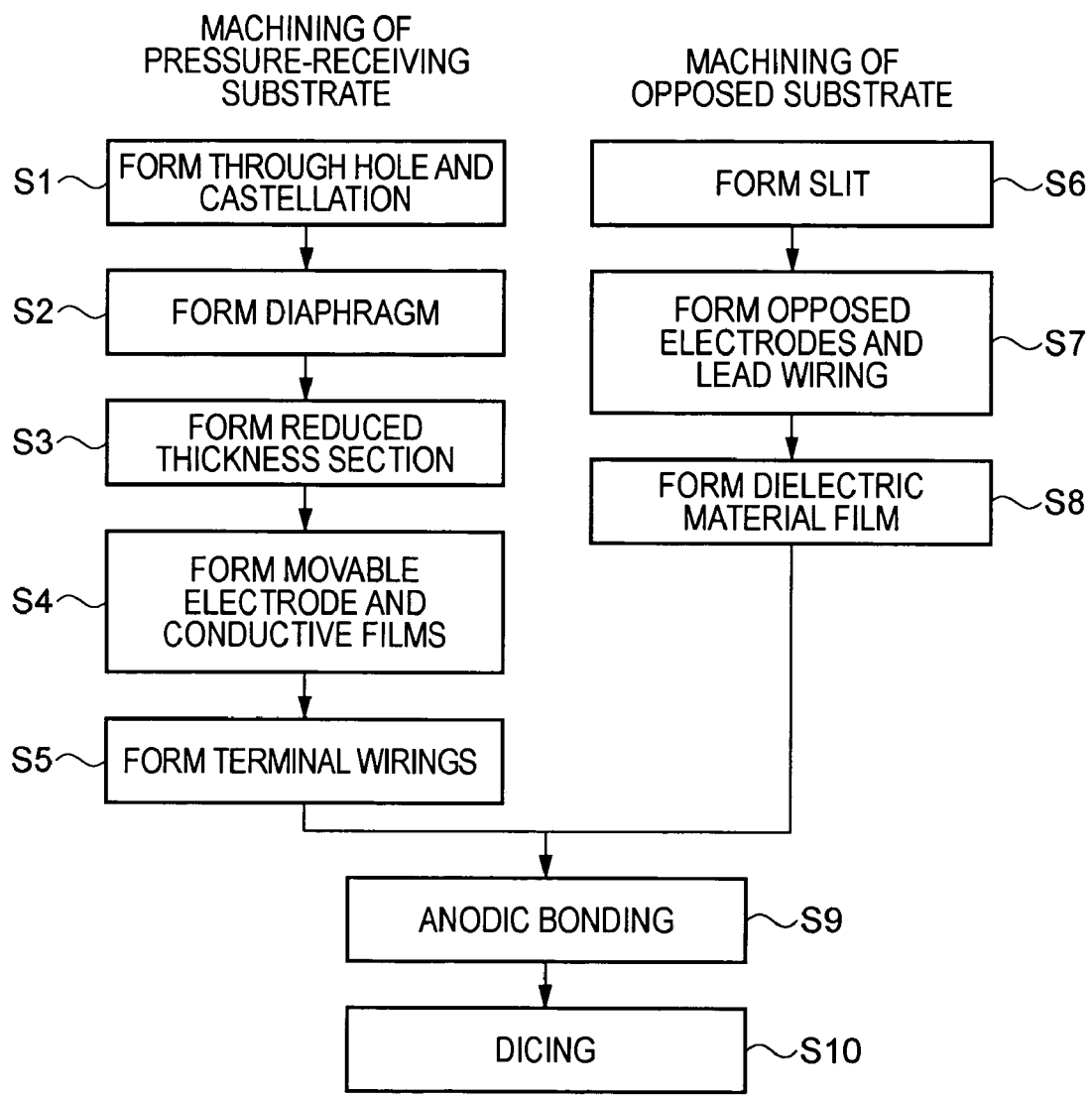
FIG. 6 is a flowchart showing manufacture steps of the pressure sensor.

FIG. 6 is a flowchart illustrating manufacture steps of a pressure sensor.

The pressure sensor 1 is manufactured in the following manner. First, the pressure-receiving substrate 10 is subjected to Steps S1 to S5 of FIG. 6 and the opposing substrate 20 is subjected to the machining steps of Steps S6 to S8 of FIG. 6, respectively. Then, the substrates 10 and 20 are joined by an anodic bonding (Step S9 for junction of FIG. 6). Finally, the resultant structure is diced to provide individual pieces (Step S10 of FIG. 6). Hereinafter, the respective steps will be described in detail.

Step S1 forms, by etching for example, the through hole 15 and the castellation 16 in the pressure-receiving substrate 10. It is noted that the castellation 16 before subjected to a dicing process has the same structure as that of the through hole 15.

Step S2 subjects both surfaces of the pressure-receiving substrate 10 to an etching processing for example to form the diaphragm 11. The diaphragm 11 is designed to have a shape and a size by which an appropriate deformation characteristic can be obtained under a usage environment. For example, the diaphragm 11 is sized so that one side is about 0.9 mm for example and the thickness is about 10 μm for example. A depth of the concavity from the opposing face 10*a* to the surface of the diaphragm 11 is designed so that an area under a usage environment at which the movable electrode 13 has a contact with the dielectric material film 23 is within an appropriate range (e.g., about 6 μm).

The thickness size of the diaphragm 11 in particular has a sharp influence on the deformation characteristic. Thus, in order to suppress the deformation characteristics from fluctuating, the thickness size requires a highly-accurate control of the machining process. It has been known that a thickness slip vibration reed for the AT cut for example is involved with an inverse relationship between the thickness size and the resonance frequency. Thus, this embodiment measures a piezoelectric vibration characteristic of the diaphragm 11 in a thickness slip mode or a thickness longitudinal mode so that the thickness size can be accurately measured and the difference in size among lots and individual pieces can be reduced by an etching for minute adjustment. The reason why the pressure-receiving substrate 10 uses the crystal plate cut by an AT cut is for convenience of the measurement of this piezoelectric vibration characteristic.

Step S3 forms the reduced thickness section 12 in the same procedure as that of Step S2. The size and shape of the reduced thickness section 12 are a factor related to a spring characteristic of the contact point 3 and thus must be designed appropriately. It is noted that this reduced thickness section 12 is provided, as described above, for the purpose of improving the flatness of the joint surface (contact face) of the substrates 10 and 20. However, this reduced thickness section 12 is an additional requirement for improving the effect of the invention and thus can be omitted.

Step S4 uses the gas phase method and the photolithographic method for example to form the movable electrode 13 and the conductive films 14*a*, 14*b*, and 14*c* at the opposing face 10*a* of the pressure-receiving substrate 10. Specifically, Step S4 is a step for forming a conductive film of the invention.

Step S5 uses the gas phase method and the photolithographic method for example to form the terminal wirings 17 and 18 at the outer face 10*b* of the pressure-receiving substrate 10. It is noted that, in Step S5, a dummy wiring for short-circuiting the terminal wiring 17 and the terminal wiring 18 through all individual pieces in a single substrate is formed in a region to be cut off by a dicing operation. This is consideration for allowing Step S9 to use a single terminal, when an anodic bonding is performed, to provide a common potential to the conductive films 14*a*, 14*b*, and 14*c*.

Step S6 uses a sand blaster for example to form a slit 24 at the opposing face 20*a* of the opposing substrate 20. For the purpose of reducing the in-plane distortion by the junction, the slit 24 may have a small width and preferably has a certain depth (e.g., 40% or more of the substrate thickness).

Step S7 uses the gas phase method and the photolithographic method for example to form the opposed electrodes 21 and the lead wiring 22 at the opposing face 20*a* of the opposing substrate 20.

Step S8 uses the gas phase method and the photolithographic method for example to form the dielectric material film 23 at the opposing face 20*a* of the opposing substrate 20.

A junction step S9 applies, while performing pressurization and heating processings, a high voltage between the conductive film 14*a*, 14*b*, and 14*c* as an anode and the opposing substrate 20 as a cathode to subject the pressure-receiving substrate 10 and the opposing substrate 20 to an anodic bonding. The substrates 10 and 20 are joined by joining flat joint surfaces having no step (i.e., the surfaces of the conductive films 14*a* and 14*c*) with the opposing face 20*a*. This provides a strong junction strength and a high sealing reliability in the pressure reference room 2. It is noted that this junction step S9 is performed under the same pressure as the reference pressure, thereby specifying the reference pressure of the pressure reference room 2.

In a cooling process after the anodic bonding, the substrates 10 and 20 shrink by an amount depending on the respective thermal expansion coefficients. During the shrinkage, the substrates 10 and 20 include therein an in-plane distortion (residual stress) depending on the difference in the thermal expansion coefficient between the substrates. In this embodiment, the pressure-receiving substrate 10 using quartz shrinks in a larger amount than that of the opposing substrate 20 using glass. Thus, the pressure-receiving substrate 10 includes distortion that extends the pressure-receiving substrate 10 in an in-plane direction of the substrate 10 and the opposing substrate 20 includes distortion that shrinks the substrate 20 in an in-plane direction. The slit 24 has a function to reduce such a distortion as described above.

Finally, Step S10 dices the substrate to individual pieces. Then, the region formed by Step S5 in which a dummy wiring is formed is cut off, thereby completing the pressure sensor 1 as an individual piece.

MODIFIED EXAMPLE 1

Next, Modified Example 1 of the invention will be described with reference to FIG. 7 mainly with regards to the difference between Modified Example 1 and the above-described embodiment.

Figure 7:
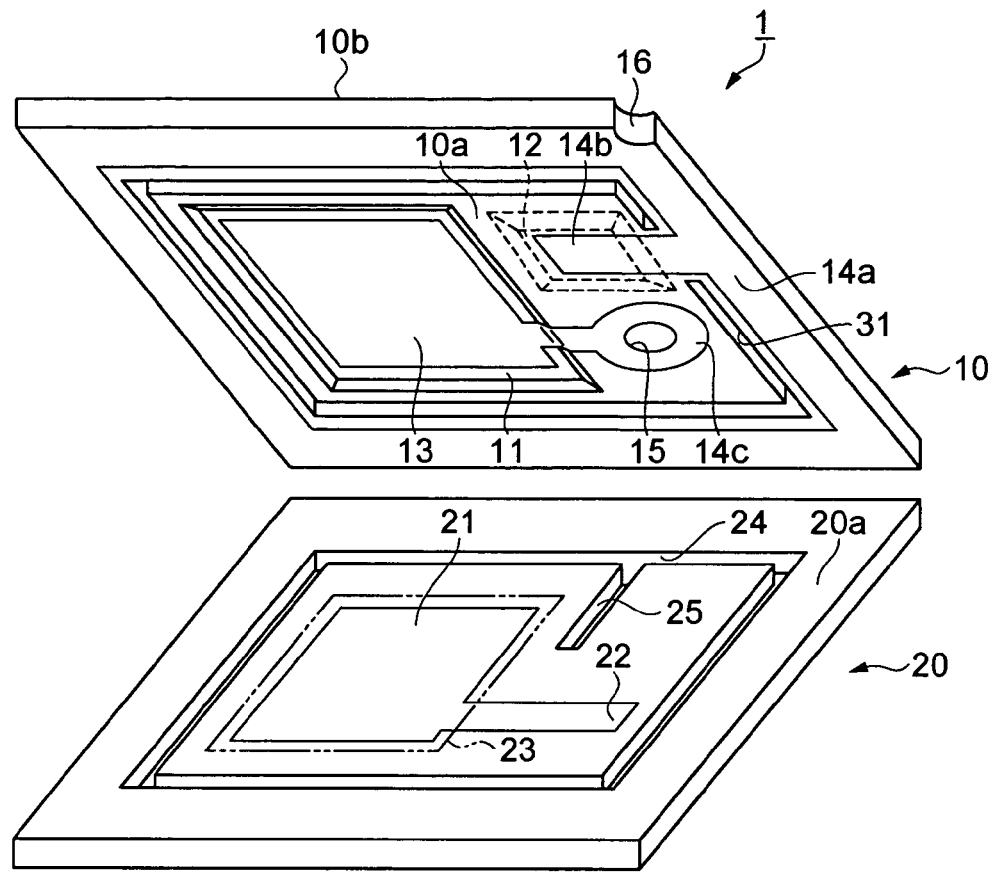
FIG. 7 is an exploded perspective view showing an internal structure of a pressure sensor according to Modified Example 1.

FIG. 7 is an exploded perspective view illustrating an internal structure of the pressure sensor according to Modified Example 1.

In Modified Example 1, the opposing face 10a of the pressure-receiving substrate 10 also includes a slit 31 to further reduce the in-plane distortion. The opposing face 20a of the opposing substrate 20 includes a slit 25 for dividing the junction section of the conductive film 14c from the opposed electrodes 21. This preferably reduces the in-plane distortion caused in accordance with the junction of the conductive film 14c and the opposing face 20a.

As in Modified Example 1, a slit may be provided in the pressure-receiving substrate or also may be formed in a different region depending on the junction section.

MODIFIED EXAMPLE 2

Next, Modified Example 2 of the invention will be described with reference to FIG. 8 mainly with regards to the difference from the above-described embodiment.

Figure 8:
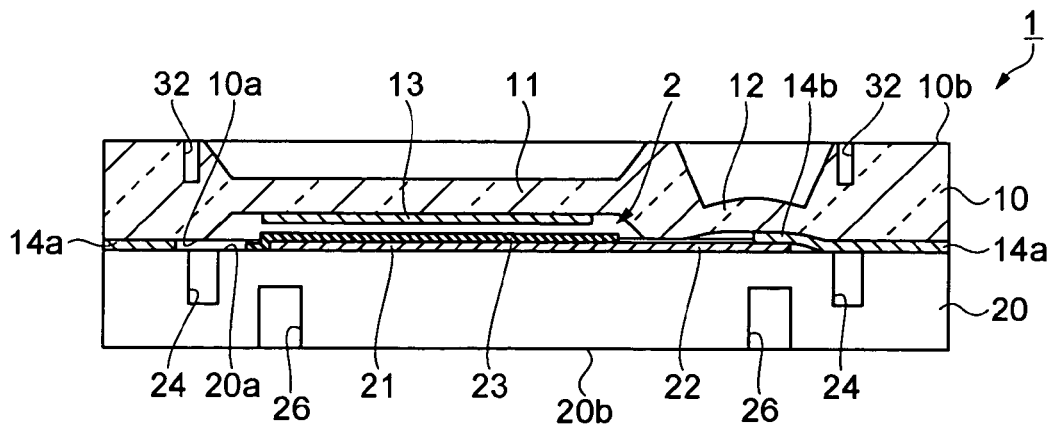
FIG. 8 is a cross-sectional view showing a pressure sensor according to Modified Example 2.

FIG. 8 is a cross-sectional view illustrating a pressure sensor according to Modified Example 2.

In Modified Example 2, the outer face 10b of the pressure-receiving substrate 10 includes a slit 32 and the outer face 20b of the opposing substrate 20 also includes a slit 26. As in Modified Example 2, a slit may be provided at the outer face of the substrate.

The invention is not limited to the above-described embodiments.

For example, the pressure-receiving substrate also may use, in addition to quartz, glass, silicon, ceramic or the like.

Although the above-described embodiments join the two substrates by an anodic bonding, the junction is not limited to this. Any junction method using a temperature change (e.g., heating processing) also can be used to provide the same effect as that by the invention by a slit.

The movable electrode in a diaphragm also can be provided, as in the pressure sensor according to JP-A-2002-214058, by doping impurity in a diaphragm region formed in the silicon substrate.

The invention also can be applied to a capacitive pressure sensor in which a movable electrode does not have a contact with a dielectric material film (that is not in a touch mode).

The respective structures of the respective embodiments also can be appropriately combined, omitted, or combined with another structure (not shown).

The entire disclosure of Japanese Patent No. 2005-242246 filed Aug. 24, 2005, is expressly incorporated by reference herein.

What is claimed is:

1. A pressure sensor provided by joining, at opposing faces, a first substrate having a movable electrode formed at a diaphragm with a second substrate having an opposed electrode opposed to the movable electrode, wherein:
    a slit that peripherally surrounds one of the movable electrode and the opposed electrode is formed on at least one of the first and second substrates.

2. The pressure sensor according to claim 1, wherein the slit is provided at the opposing face of at least one of the first and second substrates.

3. The pressure sensor according to claim 1, wherein the slit is formed in a region adjacent to a junction section.

4. The pressure sensor according to claim 1, wherein the first and second substrates are joined to seal a predetermined region at the opposing face of the diaphragm to provide a pressure reference room.

5. The pressure sensor according to claim 4, wherein the slit is provided in the pressure reference room.

6. The pressure sensor according to claim 1, wherein the substrate having the diaphragm uses a crystal plate.

7. The pressure sensor according to claim 6, wherein the substrate having the diaphragm uses a crystal plate cut by an AT cutting.

8. A pressure sensor provided by joining, at opposing faces, a pressure-receiving substrate having a diaphragm and composed of a crystal plate with an opposing substrate opposed to the pressure-receiving substrate, wherein:
    at least one of the two substrates includes a slit; and
    the pressure-receiving substrate having the diaphragm uses a crystal plate cut by an AT cutting.

* * * * *